(12) United States Patent
Tijsma et al.

(10) Patent No.: US 6,787,234 B2
(45) Date of Patent: Sep. 7, 2004

(54) TRIGGERED START PRODUCTS AND PROCESSES FOR THE PRODUCTION AND USE THEREOF

(75) Inventors: Edze Jan Tijsma, Maastricht (NL); Johannes Gijsbertus Antonius Terlingen, Landgraaf (NL); Saskia Haas-Schrijen, Kerkrade (NL); Hein Herman Vriesema, Bunde (NL)

(73) Assignee: OMS Investments, Inc., Los Angeles, CA (US)

( * ) Notice: Subject to any disclaimer, the term of this patent is extended or adjusted under 35 U.S.C. 154(b) by 227 days.

(21) Appl. No.: 10/146,314

(22) Filed: May 15, 2002

(65) Prior Publication Data

US 2003/0215657 A1 Nov. 20, 2003

(51) Int. Cl.[7] ................................................. B32B 5/16
(52) U.S. Cl. ...................... 428/403; 428/407; 71/64.07; 71/64.13; 71/11; 71/27
(58) Field of Search ............................. 71/64.07, 64.13, 71/11, 27; 428/403, 407

(56) References Cited

U.S. PATENT DOCUMENTS

| | | | |
|---|---|---|---|
| 3,223,518 A | | 12/1965 | Hansen |
| 3,295,950 A | | 1/1967 | Blouin et al. |
| 3,342,577 A | | 9/1967 | Blouin et al. |
| 3,576,613 A | | 4/1971 | Fleming |
| 3,903,333 A | | 9/1975 | Shirley et al. |
| 4,019,890 A | | 4/1977 | Fujita et al. |
| 4,042,366 A | * | 8/1977 | Fersch et al. .................. 71/29 |
| 4,549,897 A | | 10/1985 | Seng et al. |
| 4,636,242 A | | 1/1987 | Timmons |
| 4,657,576 A | | 4/1987 | Lambie |
| 4,857,098 A | | 8/1989 | Shirley, Jr. |
| 4,880,455 A | | 11/1989 | Blank |
| 4,881,963 A | | 11/1989 | Fujita et al. |
| 5,089,041 A | * | 2/1992 | Thompson et al. ......... 71/64.11 |
| 5,186,732 A | | 2/1993 | Thompson et al. |
| 5,219,465 A | | 6/1993 | Goertz et al. |
| 5,340,376 A | * | 8/1994 | Cunningham .................... 71/6 |
| 5,374,292 A | | 12/1994 | Detrick et al. |
| 5,405,426 A | | 4/1995 | Timmons et al. |
| 5,547,486 A | | 8/1996 | Detrick et al. |
| 5,599,374 A | | 2/1997 | Detrick |
| 5,652,196 A | | 7/1997 | Luthra et al. |
| 5,679,129 A | * | 10/1997 | Hon .......................... 71/64.11 |
| 5,858,094 A | | 1/1999 | Detrick et al. |
| 6,139,597 A | * | 10/2000 | Tijsma et al. .............. 71/64.11 |
| 6,338,746 B1 | | 1/2002 | Detrick et al. |
| 6,544,540 B2 | * | 4/2003 | Van Koppenhagen et al. ... 424/408 |
| 2002/0004059 A1 | | 1/2002 | Van Koppenhagen et al. |

OTHER PUBLICATIONS

"Controlled Release Fertilizers with Polyolefin Resin Coating"; pp. 1–91 (S. Shoji and A. Gandeza 1992).
"Physiology of Aliphatic Hydrocarbon–Degrading Microorganisms", Robert J. Watkinson & Philip Morgan; Biodegradation1, pp. 79–92, 1990.

* cited by examiner

Primary Examiner—H. Thi Le
(74) Attorney, Agent, or Firm—Jones Day

(57) ABSTRACT

A coated triggered start product is formed from a particulate core material comprising at least one water soluble active constituent and at least one coating layer applied on the particulate core material. The coating layer causes the product to exhibit "lock-off" type release characteristics whereby release of the active constituent of the core material from the coated product is essentially completely suppressed until release is initiated by application of a trigger material to the coating layer. Processes for preparing and using such triggered start products are also provided.

31 Claims, No Drawings

TRIGGERED START PRODUCTS AND PROCESSES FOR THE PRODUCTION AND USE THEREOF

BACKGROUND OF THE INVENTION

1. Field of the Invention

The present invention relates to coated triggered start products such as coated triggered start fertilizer products. More particularly, it relates to coated products in particulate form which are structured to provide essentially complete suppression or inhibition of release of active constituents such as fertilizer nutrients from the coated products until release is initiated or triggered by application of a trigger material at a time determined by a user of the products. The invention further relates to processes for producing such coated particulate triggered start products which are effective for preventing premature release of active constituents for a desired period of time, as determined by a user of the products, until release is initiated or triggered by application of a trigger material. Still further, the invention relates to processes for use of the coated particulate triggered start products.

2. Description of Related Art

Controlled release fertilizer (CRF) products which are also termed "slow release" fertilizers have been known heretofore. The known CRF products can be categorized into various groups with one of such groups being coated (or encapsulated) fertilizers. Such coated fertilizers are known to be very effective sources of controlled release nutrients for feeding plants. Specifically, nutrient core materials are released from the coated fertilizers at controlled rates through the fertilizer's coating resulting in sustained feeding of plants. Thus, a single application of these coated CRF products provides the necessary nutrients for a plant that would require multiple applications of soluble fertilizers.

The functionality of coated CRF products is dependent on the rate of transport of water through the encapsulating or protective coating applied over the granular nutrient core material; and on the rate of release of the core material as a nutrient solution formed when the water entering through the coating contacts the granular core. Thus, the physical nature of the fertilizer core granule itself, the water (vapor) permeability of the coating and the strength of the coating all are factors in achieving the desired release rate of nutrients from CRF products.

One type of coated CRF product in wide use is sulfur-coated fertilizer, such as the fertilizers described in U.S. Pat. Nos. 3,295,950; 3,342,577; 3,576,613; 3,903,333; 4,042,366; 4,636,242; 4,857,098; 4,881,963; 5,219,465; 5,405,426; 5,599,374 and 6,338,746. The release of nutrients from sulfur-coated fertilizers occurs by diffusion through imperfections in the sulfur coating and through coating breakdown resulting from microbial action in the ambient environment. The major advantage of the sulfur-coated fertilizers is their relatively low cost.

Another type of CRF product utilizes polymer coatings such as solvent applied polymer coatings. The polymeric materials applied are either thermosetting resins or thermoplastics. Examples of solvent applied thermosetting resin coated fertilizers, which are currently in use, are disclosed in U.S. Pat. Nos. 3,223,518; 4,657,576 and 4,880,455, whereas examples based on thermoplastics can be found in U.S. Pat. No. 4,019,890. Other polymer coated fertilizers are described in U.S. Pat. Nos. 5,374,292; 5,547,486; 5,652,196 and 5,858,094. Another polymer encapsulated fertilizer that exhibits good controlled release properties is a latex coated granular fertilizer such as the fertilizers disclosed in U.S. Pat. Nos. 4,549,897 and 5,186,732. Both solvent and latex applied polymer coated fertilizers offer important benefits over sulfur-coated products concerning consistency of release rates. The majority of nutrient release is by diffusion through pores in the polymer coating, rather than release through coating imperfections.

The release of nutrient core material from a typical CRF product is initiated when a sufficient amount of water is present in the ambient surroundings for transport through the encapsulating coating into the core. However, this mode of operation presents a commercially significant problem, for example, in regard to the formulation of CRF products suitable for pre-mixing with a substrate such as a growing media. Specifically, growing media such as potting soil, peat moss, coir/pith blends and the like, commonly used in combination with CRF products always contain a significant amount of water (up to 70 wt. %). As a result, it has been a recognized shortcoming of previously available CRF products that, upon storage in growing media, these products have exhibited premature release of their nutrient content resulting in a loss of available nutrients for plant growth when the fertilizer treated growing media are applied after storage. Moreover, the use of such stored CRF-containing growing media is not only inefficient for providing nutrients on a timely basis, but can even be dangerous to the plants since too great a quantity of nutrients may be immediately available when a new plant or seedling is placed in the treated growing media so that the plant or seedling may be damaged.

In order to prevent undesirable water transport that results in premature release of the nutrient core material during storage, for example, one approach that could be taken would be to suppress the water transport into the granule core. An alternative approach would be to prevent the transport of dissolved core nutrient solution out of the core. A third possible approach would be to combine both of the above-noted procedures by suppressing water transport into the core and preventing transport of dissolved nutrients out of the core. However, the most effective approach for avoiding water transport resulting in premature release of nutrient core materials would be to formulate the coatings of the CRF products in a manner such that the coatings actually cause "lock off" of the nutrient core material.

Heretofore, it has been generally acknowledged that coating of nutrient core materials with too thick a coating layer or with a coating having overly effective barrier properties towards water transport and the like would result in CRF products exhibiting "lock off" nutrient release characteristics. Such products have been considered to be highly undesirable since there has been no effective and/or cost efficient mechanism for releasing the nutrients at a desired time from the core of a product exhibiting such "lock off" release characteristics. In fact, it has been believed previously that a coated fertilizer product that exhibits "lock-off" necessarily would be agronomically ineffective as a result of the inability of the product to release sufficient amounts of nutrients during a given fertilization period. CRF products have been considered to suffer from "lock-off" condition when less than 10 weight percent (wt %) of the nutrient core materials release from the CRF product after the product is exposed to moisture.

In published U.S. patent application Ser. No.2002/0004059, base-triggered release microcapsules are described wherein the microcapsules are formed of an amnioplast shell wall which breaks down or disintegrates relatively quickly under basis pH conditions to release an encapsulated substance, preferably, a liquid material such as a liquid pesticide. As described in this publication, when the microcapsules are not in a basic environment, they function as typical diffusion controlled release microcapsules, permitting release of the encapsulated substance into the surrounding area in a controlled manner which is determined by wall characteristics of the shell such as thickness, capsule size, permeability, etc. Thus, these microcapsules do not cause "lock off" of the encapsulated liquid materials and effectively act as a controlled release product until they are placed in a basic environment at a pH of about 8–13 at which time the capsule wall is cleaved to "trigger" or initiate breakdown of the capsule wall to enable complete release of the encapsulated liquid.

Thus, it has been recognized heretofore that it would be highly desirable to provide CRF products which exhibit delayed transport of water into contact with the nutrient core for a period of time specifically controlled by a user of the products. However, it has been a continuing problem in formulating such CRF products and there has been a long felt need for fertilizer products which effectively exhibit no premature release of nutrient core material during storage under moist/damp conditions such as are found in substrates such as wet growing media, soils and the like. Specifically, a need has existed for unique types of CRF products that: (i) essentially exhibit "lock off" effects when stored in growing media so that no premature release of nutrients occurs, particularly, in wet growing media; and (ii) can be "triggered" to begin release of the nutrients at a particular time as determined by a user of the products. Such products can be characterized as being "triggered start" or "TS" products and are referenced as such herein.

In this regard, it should be recognized that so-called "triggered start" or TS products should not only display a delay of nutrient release but, also, should demonstrate initiation of nutrient release at a time under the control of and determined by a user of the products dependent upon application of a so-called "trigger" composition by the user so that the nutrient release "lock off" can be overcome at any time by applying the trigger composition. It should be further recognized that no particulate controlled release agricultural products have been known heretofore which could be classified as triggered start or TS products including, but not limited to, products wherein the water soluble core materials comprise insecticides, herbicides, fungicides, pheromones, biostimulants, growth regulators, animal repellents, insect repellents and the like in addition to fertilizers.

SUMMARY OF THE INVENTION

Accordingly, it is a principle object of the present invention to provide coated triggered start or TS products, especially fertilizer products as well as other products such as those having insecticides, herbicides, fungicides, pheromones, biostimulants, growth regulators, animal repellents, insect repellents and the like as the active constituent of the core materials.

It is a more specific object to provide coated controlled release products exhibiting "lock-off"-type release characteristics whereby release of active constituents such as fertilizer nutrients and other water soluble core materials from the coated products is essentially completely suppressed or inhibited until release is initiated or triggered by application of a suitable trigger composition to the products at a time under the control of and in an amount determined by a user of the products.

A further object is to provide coated triggered start or TS products in which the coating layer causes less than 10 weight percent of the active constituents of the core material to release from the products after the products are exposed to moisture prior to the application of a trigger material such as a biological and/or chemical release agent to the coating layer.

Other objects of this invention are to provide processes for producing coated triggered start or TS products and for utilizing coated triggered start or TS products applied to a substrate such as a growing medium.

The foregoing and other objects of the invention are accomplished by providing a coated triggered start product and processes for producing and using such triggered start product. The triggered start product comprises a particulate core material having at least one water soluble active constituent such as a fertilizer, an insecticide, a herbicide, a fungicide, a pheromone, a biostimulant, a growth regulator, an animal repellent, an insect repellent and the like and mixtures thereof; and at least one coating layer applied on the particulate core material whereby the coating layer causes the product to exhibit "lock-off"-type release characteristics in which the release of the active constituent(s) of the core material from the coated product is essentially completely suppressed until release is initiated by application of a trigger material to the coating layer. Coated triggered start products exhibit "lock-off"-type release characteristics when less than 10 weight percent of the active constituent(s) of the core material releases from the product after the product is exposed to moisture prior to the application of the trigger material to the coating layer.

DETAILED DESCRIPTION OF A PREFERRED EMBODIMENT OF THE INVENTION

While the triggered start products of the present invention are useful for the controlled release of a variety of active constituents, they are primarily useful for the controlled release of fertilizers and, accordingly, will be specifically described in connection with a water soluble fertilizer core material. However, it is to be recognized that the invention is also applicable to controlled release of other coated water soluble active constituents where prolonged or controlled release is desirable, including pesticides, herbicides, fungicides, growth regulators, insecticides, pheromones, biostimulants, growth regulators, animal repellents, insect repellents and the like. Such active constituents are well known and examples are set forth in the literature. It is preferable that the active constituent be in solid, granular or particulate form and it should not decompose or melt at processing temperatures. In addition, the active constituent should be moderately to highly water soluble.

In accordance with the present invention, an outer coating on a CRF product and/or an additional coating layer applied over a preexisting outer coating on a CRF product is employed to prevent premature release of the nutrient core material and must cause the product to exhibit "lock-off" release characteristics. Furthermore, the outer coating must be trigger-sensitive so as to release or be opened upon application of a suitable trigger material thereto. Additionally, in a preferred embodiment of this invention, after application of the trigger material to a TS product having an additional coating layer applied on a pre-existing coated CRF product, the product should release its nutrient core in accordance with the release specifications of the original coated CRF product.

A triggered start or TS product of the present invention comprises a particulate or granular core material having at least one coating layer applied on the core material in a manner such that the coating layer causes the product to exhibit "lock-off" type release characteristics whereby release of the active constituent of the core material from the coated product is essentially completely suppressed until release is initiated by application of a trigger material to the coating layer. In forming such a triggered start product, it should be noted that any type of controlled release coating capable of preventing moisture from penetrating from outside the product into the core thereof can be employed; particularly, any type of coating which can be employed to produce controlled release fertilizer (CRF) products; provided that the coating, whether applied as an extra coating layer or as a base coating layer, is suitable for essentially causing the product to exhibit "lock-off" type release characteristics.

For practical considerations, the triggered start or TS products of this invention are considered to demonstrate "lock off" or to be closed when less than 10 weight percent of the active constituents of the core material, such as the nutrient contents, are released from the product after the product has been exposed to moisture and prior to the application of a trigger material to the coating layer.

In preparing the triggered start products of the present invention, any known coated CRF products can be employed as the particulate core substrate over which an additional trigger sensitive outer coating layer is applied in order to cause "lock-off" of active ingredient release until application of the trigger material. Furthermore, it is contemplated that certain coating materials employed in known CRF products may be trigger sensitive themselves so that triggered start products of the present invention can be prepared utilizing such coatings on particulate core materials without applying an additional outer layer thereover.

Known coated CRF products that can be employed in the production of the triggered start products of the present invention include, but are not limited to, any of the previously known SCU products, thermoplastic and thermosetting polymer coated CRF products and the like. Examples of suitable coated CRF products for use in the TS products of the present invention are the fertilizer products described in U.S. Pat. Nos. 3,223,518; 3,295,950; 3,342,577; 3,576,613; 3,903,333; 4,019,890; 4,042,366; 4,549,897; 4,636,242; 4,657,576; 4,857,098; 4,880,455; 4,881,963; 5,186,732; 5,219,465; 5,374,292; 5,405,426; 5,547,486; 5,599,374; 5,652,196; 5,858,094 and 6,338,746; as well as the CRF products described in publications such as "Controlled Release Fertilizers with Polyolefin Resin Coating", by S. Shoji and A. T. Gandeza, Konno Printing Co. Ltd, Sendai, Japan, 1992, the disclosures of which are all incorporated herein by reference.

The particulate or granular core material for use in preparing the triggered start products of the present invention may comprise any known NPK or fertilizer granules including, but not limited to, potassium nitrate, potassium sulphate, urea, ammonium nitrate, ammonium sulphate, monopotassium sulphate, ammonium phosphate, or fertilizers obtained from compounding a mixture of these fertilizer materials. In a preferred embodiment, the triggered start products of this invention contain primary constituents (NPK); secondary constituents (magnesium, calcium, sulfur); and/or micronutrient trace metal constituents such as iron, manganese, boron, molybdenum, copper, zinc and the like. Furthermore, the core material may comprise insecticides, herbicides, fungicides, pheromones, biostimulants, growth regulators, animal repellents, insect repellents and the like, and mixtures thereof.

Generally, in the practice of the present invention, an additional coating layer is applied over the CRF product composition in an amount or in a thickness or having a composition which will essentially cause complete "lock-off" of moisture from entering into the core. The composition of this additional coating layer may be based on any kind of material, such as thermoplastic or thermosetting polymers which are able to form a uniform continuous film, and which are removable from the core material by treatment with a suitable "trigger" material.

In the present invention an additional thermoplastic coating layer may comprise hydrocarbon waxes, e.g. paraffin wax, natural waxes, e.g. esters of fatty acids, vinyl resins, e.g. poly(vinyl acetate), poly(vinyl alcohol), poly(vinyl chloride), poly(vinylidene chloride), poly(vinyl pyrrolidone), poly(vinyl acetal), and poly(vinyl methylacetamide), polyolefines, e.g. polyethylene, polypropylene, and polyisobutylene, styrene-based polymers, acrylic polymers, polyesters, e.g. poly(alkylene terephthalate), poly(caprolactone), poly(oxy alkylene)s, e.g. poly(ethylene oxide), and poly(propylene oxide), cellulose derivatives, e.g. celluloseacetate, polyamides, polamines, polycarbonates, polyimides, polysulfones, polysulfides, polysaccharides and polyurethanes (either aliphatic or aromatic).

In the present invention, an additional thermosetting coating layer may comprise polyesters, e.g. alkyds, and modified alkyds, phenolic resins, epoxy resins, urethane resins, and aminoplastics.

Preferably, the coating layer employed in forming the triggered start products of this invention are formed in such a manner that coating layer meets the following functional criteria:

(a) possesses good film-forming properties on particles or granules such as CRF products (e.g., with good adhesion), (b) results in a coating with good barrier properties towards water transport, (c) yields a non-toxic coating, and (d) results in a coating which is trigger-sensitive (i.e., removable by application of a trigger material).

In particular, the composition of the coating layers can be further characterized by exhibiting good adhesion to CRF coated granules. Furthermore, the composition of the coating layer should of such nature that it provides an effective barrier toward water transport. Optionally, the coating layer may also include specific additives, i.e. additives which facilitate the removal of the additional coating layer. Besides, non-specific additives (inert fillers), such as talc, may be applied.

When an additional coating layer is applied on a CRF product, the coating may be applied from a melt, from solution or from dispersion. When applied from a solution it is preferred that a solvent is used in which the resin dissolves at all ambient temperatures, thus making it possible to use resin solutions having a relatively high solids content (more than 40% by weight).

In a preferred embodiment of this invention, the coating layer comprises a mixture of hydrocarbon waxes. When applied as an additional coating layer over a CRF product, the composition of such a hydrocarbon wax mixture should be such that that the viscosity of the mixture allows easy application over the CRF coated particles or granules via metered flow application, dribbling, pouring and the like or by spraying through nozzles. Optionally, anti-caking agents such as calcium stearate, talc and the like may be applied to the particulates after application of the additional coating layer.

An additional coating may be applied onto the CRF product by a number of methods. However, in a most preferred embodiment of this invention, the coating process is performed in either a rotating drum or a fluidized bed, such as a Würster column. The amount of additional coating applied on the CRF granules is adjusted so that a coating layer between about 5 and about 100 micrometers ($\mu$m) thick is applied, preferably, between about 5–40 $\mu$m.

A preferred embodiment the coating process involves applying the additional coating layer on the CRF particles or granules at a temperature above the melting point of the coating material and with sufficient agitation to insure good coverage, and subsequently cooling to ambient temperature.

The trigger material to be used to remove the additional barrier present on the TS composition may comprise compounds which act by either by biological and/or chemical means as required by the particular coating applied on the core material. Preferably, the trigger material applied should not harmful to plants.

A suitable biological trigger material may comprise bacteria or enzymes. From literature (e.g., an article entitled "Physiology of Aliphatic Hydrocarbon-Degrading Microorganisms", by Robert J. Watkinson and Philip Morgan, Shell Research Ltd., Sittingbourne, Kent, U.K., which appeared in the Journal "Biodegradation 1: 79–92", 1990, Kluwer Academic Publishers, at pages 79–92), it is known that several types of microorganisms can degrade (aliphatic) hydrocarbon materials. For instance, several exemplary groups are: bacteria (e.g. Acetobacter, Acinetobacter, Actinomyces, Alcaligenes, Bacillus, Beneckea, Corynebacterium, Flavobacterium, Mycobacterium, Nocardia, Pseudomonas, Rhodococcus and Xanthomonas); yeasts (Candida, Cryptococcus, Debaryomyces, Hansenula, Pichia, Rhodotorula, Sporobolomyces, Torulopsis and Trichosporon) and filamentous fungi (Aspergillus, Cladosporium, Corollaspora, Dendryphiella, Gliocladium, Lulworthia, Penicillium, Varicospora). Generally used enzymes systems in detergent systems are, for example, lipases and proteinase systems.

A chemical trigger material may comprise surfactants, acids, or alkaline compounds. The group of surfactants can be divided into non-ionic (e.g., fatty alcohol ethoxylates, alkylethoxylates and nonylphenolethoxylates), cationic (e.g., cetyltrimethylammonium bromide), anionic (e.g., sodium dodecylsulphate) and zwitterionic surfactants (e.g., phosphatidyl choline).

In a preferred embodiment of this invention, the trigger material comprises microorganisms capable of breaking down a hydrocarbon wax-based additional coating layer. In a further preferred embodiment, the trigger material comprises a surfactant capable of removing a waxy coating layer. In another preferred embodiment, the trigger material comprises an enzyme/surfactant mixture.

The present invention contemplates the use of the triggered start or TS products in a substrate such as a growing medium wherein the TS products can be easily and safely applied on or into the substrate according to standard practice presently employed for standard controlled release products. Furthermore, the TS products can be stored in wet growing media, without the risk of premature release of nutrients and demonstrate a release of less than 10 weight percent of the nutrients prior to application of a trigger material. Such trigger material should be applied onto the substrate containing the TS composition whenever the start of the release of nutrients is required or demanded by the user. In a preferred embodiment, the trigger material is dissolved in water, and the solution is applied to the treated substrate by watering or spraying.

The following Examples are provided to illustrate preferred products and processes for producing and using such products as well as other preferred embodiments of the present invention. All percentages set forth in the following Example are percent by weight unless otherwise designated.

EXAMPLE 1

A series of Test Sample coated products were prepared employing 3 mm (millimeter) granules of "Osmocote® 15+10+12+2MgO+Micronutrients" fertilizer as the particulate core material for each of the Test Sample products. The "Osmocote® 15+10+12+2MgO+Micronutrients" fertilizer is a commercially available CRF product manufactured and sold by Scotts International, BV comprising an NPK fertilizer with MgO and micronutrients such as iron, copper, zinc, manganese, boron and molybdenum. In production, batches of the granular "Osmocote® 15+10+12+2MgO+Micronutrients" fertilizer were placed in a rotating drum coater and heated. In each instance, after reaching a temperature of 80° C., an amount of a coating material was added onto the rotating bed of granules so as to form a coating layer on the particulate granules having a thickness in micrometers ($\mu$m) as specified in Table 1 below. Thereafter, each of the mixtures was agitated until the CRF fertilizer granules were sufficiently wetted. Subsequently, the mixture was cooled down to ambient temperature.

The following group of coating materials were employed to produce the Test Sample products in this Example 1:

| | |
|---|---|
| Coating A | Novoflow R20-4-1, a hydrocarbon wax blend (CAS 8002-74-2), commercially available from Holland Novochem. |
| Coating B | Novoflow R20-4-2, a hydrocarbon wax blend (CAS 8002-74-2) mixed with a branched wax (CAS 63231-60-7), commercially available from Holland Novochem. |
| Coating C | Novoflow R20-4-5, a hydrocarbon wax blend (CAS 8002-74-2) mixed with polybutadiene, commercially available from Holland Novochem. |
| Coating D | Novoflow R20-4-7, a hydrocarbon wax blend (CAS 8002-74-2) mixed with polyethylene (CAS 68441-17-8), commercially available from Holland Novochem. |
| Coating E | Novoflow R20-4-9, a hydrocarbon wax blend (CAS 8002-74-2) mixed with an amide wax (CAS 110-30-5), commercially available from Holland Novochem. |

The Test Sample coated products prepared in accordance with this Example 1 were as follows:

TABLE 1

| Test Samples | Coating Layer | Coating Coating Thickness ($\mu$m) |
|---|---|---|
| Sample 1 (Control) | None | — |
| Sample 2 | Coating A | 13 |
| Sample 3 | Coating B | 13 |
| Sample 4 | Coating C | 13 |
| Sample 5 | Coating D | 13 |
| Sample 6 | Coating E | 13 |
| Sample 7 | Coating B | 19 |
| Sample 8 | Coating B | 13 |
| Sample 9 | Coating C | 32 |

EXAMPLE 2

Test Samples produced in accordance with Example 1 were analyzed to determine their release properties when a Test Sample was subjected to ambient water without the application of a trigger material thereto. The test procedure employed for this purpose was a waterleach test wherein 20 g samples of the identified Test Sample coated fertilizers produced in Example 1 were placed in 400 ml of water at 21° C. At certain time intervals, the conductivity of the solution was measured and the water was replaced by fresh water. Based on the measured conductivity, the concentration of nutrient active ingredients released from the "Osmocote® 15+10+12+2MgO+Micronutrients" fertilizer core material was calculated using appropriate calibration constants.

Each of the calibration constants employed was specific for a certain type of fertilizer and needed to be determined experimentally. Alternatively, the release of nutrients can be determined by measuring the amount of nutrients present in the water by using standard chemical analytical methods. The results of the water only release tests conducted on the Test Sample products in accordance with this Example 2 are set forth in Table 2 as follows:

TABLE 2

| Test Sample | Percent Nutrient Release at 21° C. (Without Application of a Trigger Material) After a Specified Period of Time | | | | | | |
|---|---|---|---|---|---|---|---|
| | 1 Day | 7 Days | 14 Days | 28 Days | 42 Days | 56 Days | 84 Days |
| Sample 1 (Control) | 1 | 5 | 11 | 26 | 38 | 45 | 59 |
| Sample 2 | 0 | 2 | 5 | 11 | 23 | 34 | 53 |
| Sample 3 | 0 | 1 | 2 | 4 | 8 | 16 | 38 |
| Sample 4 | 0 | 1 | 1 | 3 | 5 | 11 | 32 |
| Sample 5 | 0 | 1 | 2 | 4 | 8 | 15 | 34 |
| Sample 6 | 0 | 1 | 1 | 2 | 3 | 5 | 16 |
| Sample 7 | 0 | 0 | 1 | 1 | 2 | 3 | 6 |
| Sample 9 | 0 | 1 | 1 | 2 | 2 | 3 | 5 |

EXAMPLE 3

Test Samples produced in accordance with Example 1 were analyzed to determine their release properties when a Test Sample were subjected to ambient water in combination with the application of a trigger material thereto. The trigger test procedure employed for this purpose was to place 20 g samples of coated fertilizer produced in accordance with Example 1 in 400 ml of water at 21° C. together with an amount of a trigger material as specified in Table 3 below.

At certain time intervals the conductivity of the solution was measured and the water replaced by fresh water. Based on the measured conductivity the concentration of nutrients was calculated as described above in Example 2. The release characteristics achieved with the Test Samples utilizing the trigger materials to initiate release of the active ingredients from the coated particulate core materials are set forth hereinafter in Table 3.

The trigger materials employed to initiate release of the water soluble active constituents from the "Osmocote® 15+10+12+2MgO+Micronutrients" fertilizer nutrient core material of the coated products produced in Example 1 were selected from the following group of trigger materials:

| | |
|---|---|
| Trigger 1 | Sodium dodecylsulphate. |
| Trigger 2 | Activator 0021, a fatty alcoholethoxylate, commercially available from Holland Novochem, Nieuwegein, The Netherlands. |
| Trigger 3 | Mixture of phosphonates, surfactants (anionic and non-ionic), enzymes (protease and amylase), commercially available under the brand name Biotex. |
| Trigger 4 | Nonylphenolethoxylate. |
| Trigger 5 | A synergistic mixture of microorganisms (Arthrobactor Paraffineus, ATCC 15591) specifically formulated for bioremediation purposes, commercially available from Holland Novochem under the brand name P-1. |

TABLE 3

| | Trigger Material Applied | | Percent Nutrient Release at 21° C. (With Application of a Trigger Material) After a Specified Period of Time | | | | | | |
|---|---|---|---|---|---|---|---|---|---|
| Test Sample | Trigger Type | (gram/liter) | 1 Day | 7 Days | 14 Days | 28 Days | 42 Days | 56 Days | 84 Days |
| Sample 2 | Trigger 2 | 50 | 1 | 6 | 12 | 27 | 40 | 50 | — |
| Sample 3 | Trigger 1 | 10 | 0 | 4 | 13 | — | — | — | — |
| Sample 4 | Trigger 1 | 10 | 0 | 5 | 18 | — | — | — | — |
| Sample 5 | Trigger 1 | 10 | 0 | 4 | 14 | — | — | — | — |
| Sample 5 | Trigger 2 | 50 | 1 | 3 | 7 | 22 | 33 | 43 | — |
| Sample 6 | Trigger 1 | 10 | 0 | 3 | 12 | — | — | — | — |
| Sample 7 | Trigger 1 | 10 | 1 | 3 | 7 | 12 | 19 | 41 | — |
| Sample 7 | Trigger 2 | 20 | 0 | 2 | 2 | 6 | 31 | 45 | 56 |
| Sample 7 | Trigger 2 | 50 | 0 | 3 | 7 | 16 | 48 | — | — |
| Sample 7 | Trigger 3 | 20 | 0 | 3 | 6 | 13 | 28 | 86 | — |
| Sample 7 | Trigger 4 | 50 | 0 | 2 | 6 | 15 | 21 | 28 | — |
| Sample 7 | Trigger 5 | 30 | 1 | 7 | 12 | — | — | — | — |
| Sample 9 | Trigger 2 | 20 | 0 | 2 | 6 | 30 | — | — | — |
| Sample 9 | Trigger 3 | 20 | 0 | 3 | 6 | 29 | — | — | — |

EXAMPLE 4

To determine the effectiveness of the products of the present invention in use as fertilizers for plants, a field trial was conducted wherein Test Samples of coated products produced in accordance with Example 1 (the composition of which are detailed in Table 4 below) were mixed with a normal potting soil at a rate of 2.5 grams/liter. In one potting soil sample, a solution containing 30 grams/liter (g/l) of Trigger 5, as a trigger material, was applied to the fertilizer treated soil. The amount of trigger solution applied was 100 ml per liter of potting soil. As Controls, one potting soil sample was employed having no fertilizer therein; another potting soil sample was treated with an "Osmocote® 15+10+12+2MgO+Micronutrients" CRF product but no trigger material was applied thereto; and another potting soil sample was treated with an Osmocote® 15+10+12+2MgO+ Micronutrients CRF product having an additional coating layer of 13 μm of Coating B applied thereover and without having a trigger material applied thereto.

In a greenhouse, Petunias were planted in the treated and Control potting soils. The fresh weights of the Petunias grown in each of the potting soils was determined 50 days after planting and the results are tabulated in Table 5 below. During the trial period, no phototoxicity of the triggered start product or of the trigger material employed was observed. The results of this testing are tabulated in Table 5.

TABLE 4

| Treat-ment | Test Sample | Fertilizer Application Rate (g/l Potting Soil) | Triggered at Day 1 | Trigger Conditions |
| --- | --- | --- | --- | --- |
| 1 | No Fertilizer (Control) | — | No | |
| 2 | Sample 1 | 2.5 | No | |
| 3 | Sample 8 | 2.5 | No | |
| 4 | Sample 8 | 2.5 | Yes | 100 ml of Trigger 5 solution were applied per liter of potting soil. The concentration of Trigger 5 was 30 g/l |

TABLE 5

| Treatment | Fresh weight of Petunia in g at day 50 |
| --- | --- |
| 1 | 8 |
| 2 | 31 |
| 3 | 19 |
| 4 | 26 |
| LSD* | 3.3 |

*Least Significant difference

While the present invention has been described in its preferred forms with a certain degree of particularity and with reference to specific embodiments, examples and ranges, it is to be understood that the present disclosure has been made by way of example only and it will be clear to those skilled in the art that numerous changes in the details of the compositions and in the method of their preparation and use will be apparent and modifications may be made without departing from the spirit and scope of invention which is specifically set forth and defined in the following appended claims.

What is claimed is:

1. A coated triggered start product comprising:
   a particulate core material comprising at least one water soluble active constituent, and
   at least one coating layer applied on the particulate core material;
   the coating layer causing the product to exhibit "lock-off" type release characteristics whereby release of the active constituent of the core material from the coated product is essentially completely suppressed until release is initiated by application of a trigger material to the coating layer after the product is exposed to moisture.

2. The coated triggered start product of claim 1 wherein the active constituent of the core material is selected from the group consisting of fertilizers, insecticides, herbicides, fungicides, pheromones, biostimulants, growth regulators, animal repellents, insect repellents and mixtures thereof.

3. The coated triggered start product of claim 1 wherein less than 10 weight percent of the active constituent of the core material releases from the product after the product is exposed to moisture prior to the application of the trigger material to the coating layer.

4. The coated triggered start product of claim 1 wherein the trigger material comprises a composition selected from the group consisting of biological release agents, chemical release agents and mixtures thereof.

5. The coated triggered start product of claim 4 wherein the biological release agents are enzymes.

6. The coated triggered start product of claim 4 wherein the biological release agents are microorganisms.

7. The coated triggered start product of claim 4 wherein the chemical release agents are surfactants.

8. The coated triggered start product of claim 1 wherein the coating layer comprises a polymeric composition.

9. The coated triggered start product of claim 8 wherein the polymeric composition comprises a mixture of hydrocarbon waxes.

10. The coated triggered start product of claim 1 wherein the particulate core material comprises a coated CRF product and an additional outer coating layer is applied on the coated CRF product.

11. The coated triggered start product of claim 10 wherein the additional coating layer is formulated to cause the product to exhibit "lock-off" type release characteristics whereby release of the core material from the coated CRF product is essentially completely suppressed until release is initiated by application of a trigger material to the additional coating layer.

12. The coated triggered release product of claim 11 wherein the additional outer coating layer comprises a polymeric composition.

13. The coated triggered start product of claim 12 wherein the polymeric composition comprises a mixture of hydrocarbon waxes.

14. A process for producing a triggered start product comprising
   providing particulate core material comprising at least one water soluble composition; and
   applying a coating layer on the core material;
   the coating layer being formulated to cause the product to exhibit "lock-off" type release characteristics whereby release of the core material from the coated product is essentially completely suppressed until release is initiated by application of a trigger material to the additional coating layer after the product is exposed to moisture.

15. The process of claim 14 wherein the particulare core material is selected from the group consisting of fertilizers, insecticides, herbicides, fungicides, pheromones, biostimulants, growth regulators, animal repellents, insect repellents and mixtures thereof.

16. The process of claim 14 wherein the coating layer comprises a polymeric composition.

17. The process of claim 16 wherein the polymeric composition comprises a mixture of hydrocarbon waxes.

18. The process of claim 14 wherein the particulate core material comprises a coated CRF product and an additional outer coating layer is applied on the coated CRF product.

19. The process of claim 18 wherein the additional outer coating layer comprises a polymeric composition.

20. The process of claim 19 wherein the polymeric composition comprises a mixture of hydrocarbon waxes.

21. The process of claim 18 wherein the additional coating layer is formulated to cause the product to exhibit "lock-off" type release characteristics whereby release of the core material from the coated CRF product is essentially completely suppressed until release is initiated by application of a trigger material to the additional coating layer.

22. The process of claim 14 wherein the trigger material comprises a composition selected from the group consisting of biological release agents, chemical release agents and mixtures thereof.

23. The process of claim 22 wherein the biological release agents are enzymes.

24. The process of claim 22 wherein the biological release agents are microorganisms.

25. The process of claim 22 wherein the chemical release agents are surfactants.

26. A process for use of a triggered start product in a substrate comprising:

(a) providing a triggered start product comprising:

(i) a particulate core material comprising at least one water soluble active constituent, and (ii) at least one coating layer applied on the particulate core material; the coating layer causing the product to exhibit "lock-off" type release characteristics whereby release of the active constituent of the core material from the coated product is essentially completely suppressed until release is initiated by application of a trigger material to the coating layer;

(b) mixing the triggered start product in a substrate;

(c) dissolving the trigger material in water; and (d) applying the dissolved trigger material onto the substrate containing the triggered release product by watering or spraying.

27. The process of claim 26 wherein the substrate is a growing medium and the triggered start product is mixed in the growing medium and stored therein for a period of time before the trigger material is applied to the growing medium.

28. The process of claim 14 wherein the trigger material comprises a composition selected from the group consisting of biological release agents, chemical release agents and mixtures thereof.

29. The process of claim 28 wherein the biological release agents are enzymes.

30. The process of claim 29 wherein the biological release agents are microorganisms.

31. The process of claim 28 wherein the chemical release agents are surfactants.

* * * * *